(12) United States Patent
Farney

(10) Patent No.: US 8,496,148 B2
(45) Date of Patent: Jul. 30, 2013

(54) BICYCLE CARRIER

(76) Inventor: Michael Kent Farney, Broken Arrow, OK (US)

( * ) Notice: Subject to any disclaimer, the term of this patent is extended or adjusted under 35 U.S.C. 154(b) by 1094 days.

(21) Appl. No.: 11/771,795

(22) Filed: Jun. 29, 2007

(65) Prior Publication Data

US 2008/0164292 A1 Jul. 10, 2008

Related U.S. Application Data

(60) Provisional application No. 60/817,579, filed on Jun. 29, 2006.

(51) Int. Cl.
*B60R 9/10* (2006.01)
(52) U.S. Cl.
USPC ........... 224/497; 224/509; 224/519; 224/533; 224/924
(58) Field of Classification Search
USPC ................. 224/924, 282, 497, 509, 502, 519, 224/531, 533, 534, 537; 410/3; 211/19, 20
See application file for complete search history.

(56) References Cited

U.S. PATENT DOCUMENTS

| | | | |
|---|---|---|---|
| 488,395 A | 12/1892 | Justice | |
| 567,625 A | 9/1896 | Waterman | |
| 576,351 A | 2/1897 | Penfield | |
| 3,430,983 A * | 3/1969 | Jones | 280/402 |
| 3,529,737 A | 9/1970 | Daugherty | |
| 5,692,659 A | 12/1997 | Reeves | |
| 5,833,074 A | 11/1998 | Phillips | |
| 6,019,266 A | 2/2000 | Johnson | |
| 6,062,396 A | 5/2000 | Eason | |
| 6,460,743 B2 | 10/2002 | Edgerly et al. | |
| 6,601,712 B2 * | 8/2003 | Dean et al. | 211/20 |
| 6,695,185 B2 | 2/2004 | Church | |
| 6,752,303 B2 * | 6/2004 | McLemore et al. | 224/521 |
| 6,761,297 B1 * | 7/2004 | Pedrini | 224/519 |
| 7,815,084 B2 * | 10/2010 | Allen et al. | 224/537 |

* cited by examiner

*Primary Examiner* — Justin Larson
(74) *Attorney, Agent, or Firm* — Fellers, Snider, Blankenship, Bailey & Tippens, P.C.; Scott R. Zingerman

(57) ABSTRACT

A bicycle carrier for a vehicle including a frame, a crossbar assembly, a wheel tray, and a swing arm pivotally secured to the crossbar assembly. The wheels of the bicycle are positioned in the tray and secured by a tray coupling to restrain lateral movement. Two trays may be secured to the crossbar assembly to each receive a wheel of the bicycle. The swing arm pivots on the crossbar assembly and includes a shoe which engages the bicycle wheel. A shoe coupling secures the bicycle wheel to the swing arm. Two swing arms could be pivotally secured to the crossbar assembly each to engage a bicycle wheel. The frame may include a drawbar for insertion into the receiver of a trailer hitch. Additional crossbar assemblies could be secured to the frame to accommodate multiple bicycles.

20 Claims, 9 Drawing Sheets

BICYCLE CARRIER

BACKGROUND OF THE INVENTION

Conventional bicycle carriers for vehicles have included devices which are secured to the body of a vehicle, roof of a vehicle, or the trailer hitch of a vehicle. Such conventional bicycle carrier systems are known to attach either to the frame of the bicycle, the fork of the bicycle or the wheels of the bicycle.

With regard to racks that mount to the frame of the bicycle, such mounting systems have been known to cause dents in frames as well as to scratch, chip or otherwise mar the finish of expensive bicycle frames. Such dents or scratches are generally caused by hooks, clamps, or cables secured to the frame which, during transport, rub or otherwise damage the bicycle frame. In addition, when the bicycle frame is mounted to the bicycle carrier, there is typically nothing to support the handlebars, forks and wheels such that the handlebars, forks, and front wheels are allowed to turn as a result of momentum and wind forces upon them. In addition, wheels are known to rotate freely as wind passes over them. Such movement has been known to damage expensive bicycle frames, handlebars, forks and wheels.

Fork mounted racks typically require the removal of the front wheel of the bicycle and secure to the front forks. This typically alleviates the problem of free rotation of the handlebars, forks and wheels however; the removed wheel must be stored in an alternate, secure location, such as the interior of the vehicle. Typically, when bicycles are in use, and especially with regard to mountain bicycles, these front wheels and tires are dirty and are known to transfer that dirt to the interior of the vehicle.

Wheel mounted carriers secure the wheels, forks and handlebars of the bicycle from rotation and also allow the wheels and particularly the front wheels to be stored outside of the vehicle. However, known problems associated with wheel-mounted racks are that when multiple bicycles are secured thereon, the adjacent handlebars, pedal cranks, pedals and seats are known to contact one another. During transport, vibration and friction has been known to cause damage to these adjacent bicycles. An alternative is to separate and provide a greater distance between adjacent bicycles; however, this requires a longer bicycle carrier which is disfavored for maneuverability of and accessibility to the vehicle.

A need therefore exists for a bicycle carrier, and particularly a two (2) wheel mounted bicycle carrier which allows the bicycle to be secured such that the wheels, forks, handlebars are secured from rotation but yet allows multiple bicycles to be installed to the bicycle carrier without contact while minimizing the length of the bicycle carrier. A need also exists for such a bicycle carrier which can be secured to the trailer hitch of a vehicle so as to protect the bicycles from exposure to wind, bugs, and dirt.

SUMMARY OF THE INVENTION

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

The bicycle carrier of the present invention is a two (2) wheel mounted bicycle carrier (rack) generally to be secured to a trailer hitch of a vehicle. The bicycle carrier of the present invention includes, generally, a frame, at least one (1) crossbar assembly, at least one (1) wheel tray, and a shoe affixed to the end of each swing arm. At least one (1) shoe coupling is affixed to each shoe to be secured around the bicycle wheel along with a plurality of tray couplings so as to secure the bicycle wheels in the tray, thereby secured to, and supported by the bicycle carrier.

As used herein, the term "tray" could include any apparatus for receiving and supporting the wheel/tire of a bicycle so that the wheel/tire is restrained from lateral movement. Also, as used herein, the term "wheel" may also contemplate a tire (inflated or uninflated) thereon.

The bicycle wheels are secured in the tray by a tray coupling. The tray coupling could be any suitable mechanism such as straps, clamps, braces, or the like. If the tray coupling is a strap, it may be configured so as to fasten to or around the tray and/or crossbar assembly. Any suitable fastening system is contemplated including, but not limited to, snaps, buttons, or hook and loop.

The swing arm pivots with respect to the crossbar assembly such that the shoe engages the wheel of the bicycle. A shoe coupling secures the wheel to the swing arm. The shoe coupling could be any suitable mechanism such as a strap, clamp, brace, or the like. If the shoe coupling is a strap, it may be configured so as to fasten to or around the wheel. Any suitable fastening system is contemplated, including, but not limited to, snaps, buttons, or hook and loop.

The relationship between the swing arms, tray(s), and shoes provides the ability to move the bicycle placed on the carrier forward or backward during loading. This allows great flexibility in the wheel base, or length, of the bicycle which can be secured onto the bicycle carrier. In particular, the bicycle rack of the present invention can be useful for longer bicycles such as recumbent bicycles and other such long wheel base bicycles.

In addition, the ability to move the bicycle forward and backward in the wheel tray(s) provides the ability to load multiple bicycles on a carrier such that the multiple bicycles can be positioned in close proximity to one another thereby reducing the over-all length of the rack. In this way, the seats and/or handlebars of the multiple bicycles positioned on the bicycle carrier will not contact or interfere with each other. Thus, the bicycle carrier design of the present invention provides for independent forward and rearward positioning of the bicycles on the rack such that they nest therein and thereby eliminates the inconvenience of re-positioning seat posts, entanglements of cables and like among adjacent bicycles or with handlebars and avoids any resulting damage that might otherwise occur. The bicycles are nestled closely while being prevented from touching. This nesting feature organizes the loading and unloading procedure of the bicycles into a few easy steps.

The bicycle carrier of the present invention secures the wheels in the wheel tray(s) and in the shoe/swing arms so as to secure the bicycle without clamps or straps connected to the bicycle frame. This avoids the risk of denting, scratching or otherwise damaging the frame or the paint/or other finish thereon.

An additional feature to the two (2) wheel mounted design of the bicycle carrier of the present invention is that the wheels of the bicycle(s) are not removed and are secured in place in the tray(s) and swing arm/shoe arrangement so that the wheels can not spin. Moreover, since the wheels stay on the bicycle, dirt and other debris associated with the wheels stays outside of the vehicle.

As stated above, the bicycle carrier of the present invention is secured to and supported by the trailer receiver hitch of a vehicle. In this way, the bicycle(s) supported on the bicycle carrier are positioned at the rear of the vehicle, thereby reducing the aerodynamic drag associated with the bicycle secured to the vehicle, as opposed to a rack or racks secured elsewhere such as on the roof of the vehicle or other such known locations, this results in increased fuel economy over other designs. In addition, the bicycle(s) are protected from bugs and other road debris.

DESCRIPTION OF THE INVENTION

Figure 1:
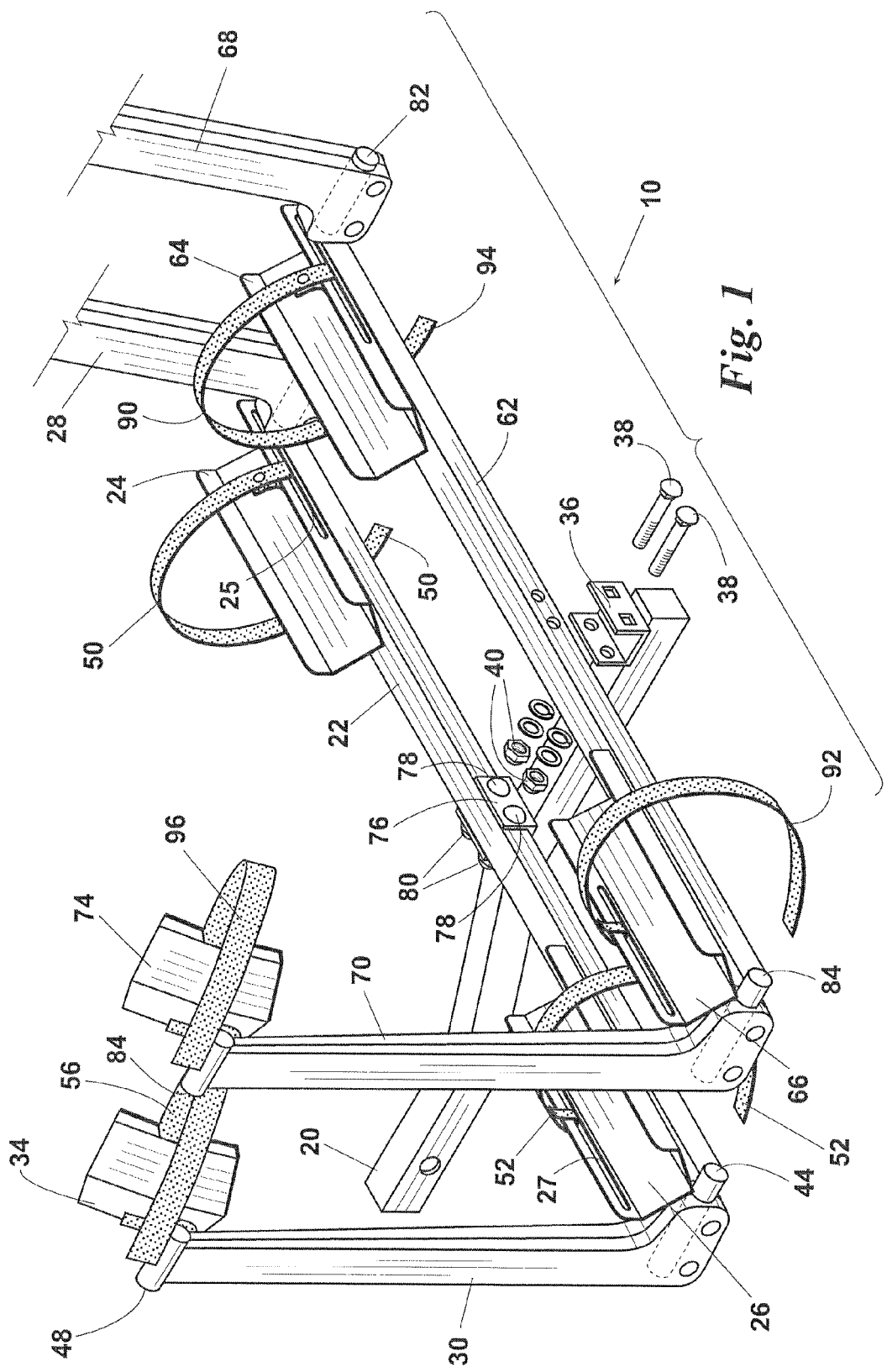
FIG. 1 is a partially exploded view of the bicycle carrier of the present invention.
Figure 2:
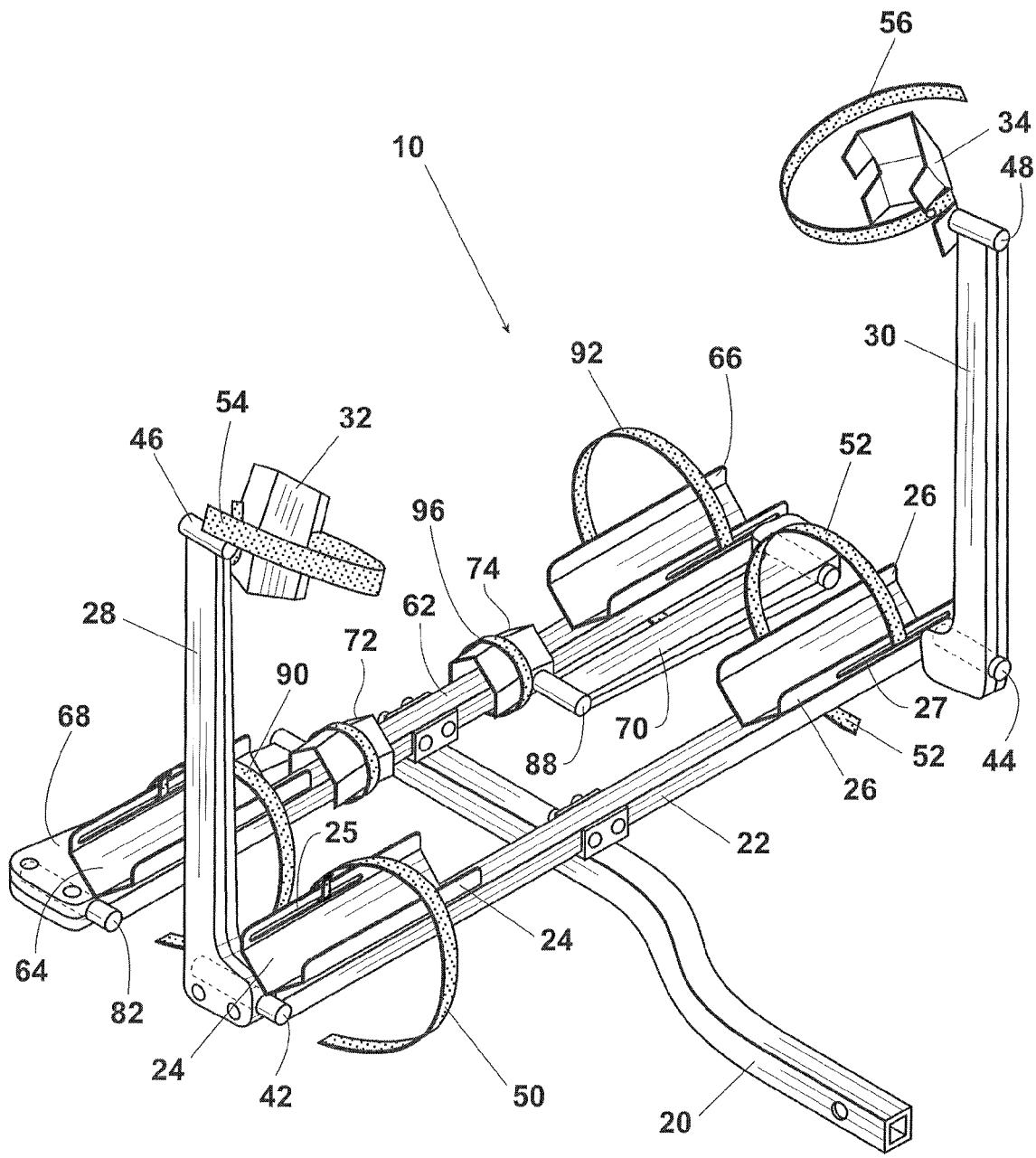
FIG. 2 is an isometric view depicting the bicycle carrier of the present invention.

Referring to the FIGS., wherein FIG. 1 depicts bicycle carrier 10 of the present invention which includes generally a frame rail 20, a crossbar assembly 22, trays 24 and 26, swing arms 28 and 30 and shoe 32 and 34 (FIG. 2). In the preferred embodiment, as depicted in FIG. 1, two (2) wheel trays 24 and 26 are affixed to crossbar assembly 22. A plurality of wheeled trays such as 24 and 26 are preferred due a reduction in weight and material costs. However, it is understood that a single wheel tray could be employed of a length sufficient to receive both a front and a back wheel of a bicycle.

Figure 8:
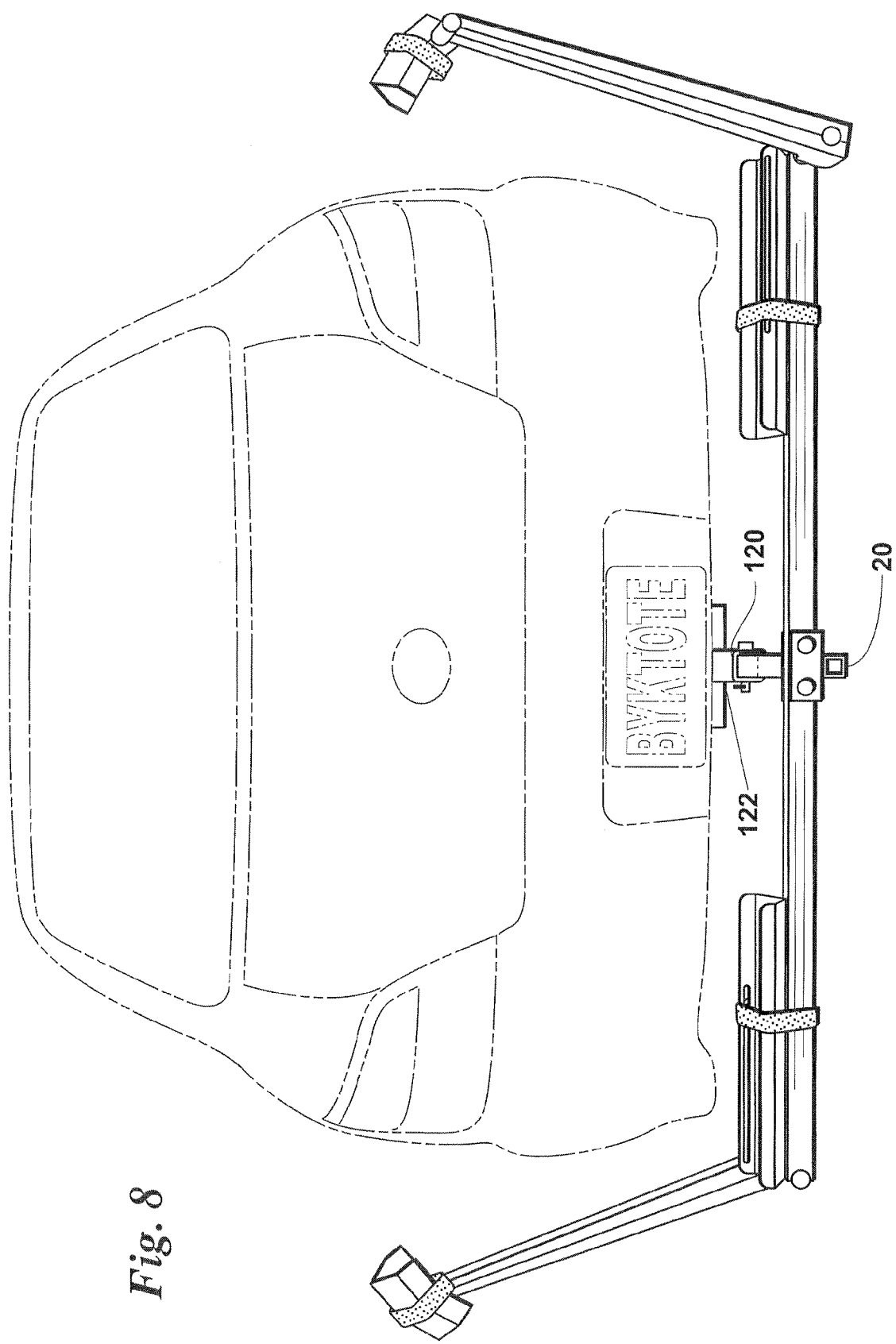
FIG. 8 depicts a back view of the bicycle carrier of the present invention secured to the trailer hitch of a vehicle.
Figure 9:
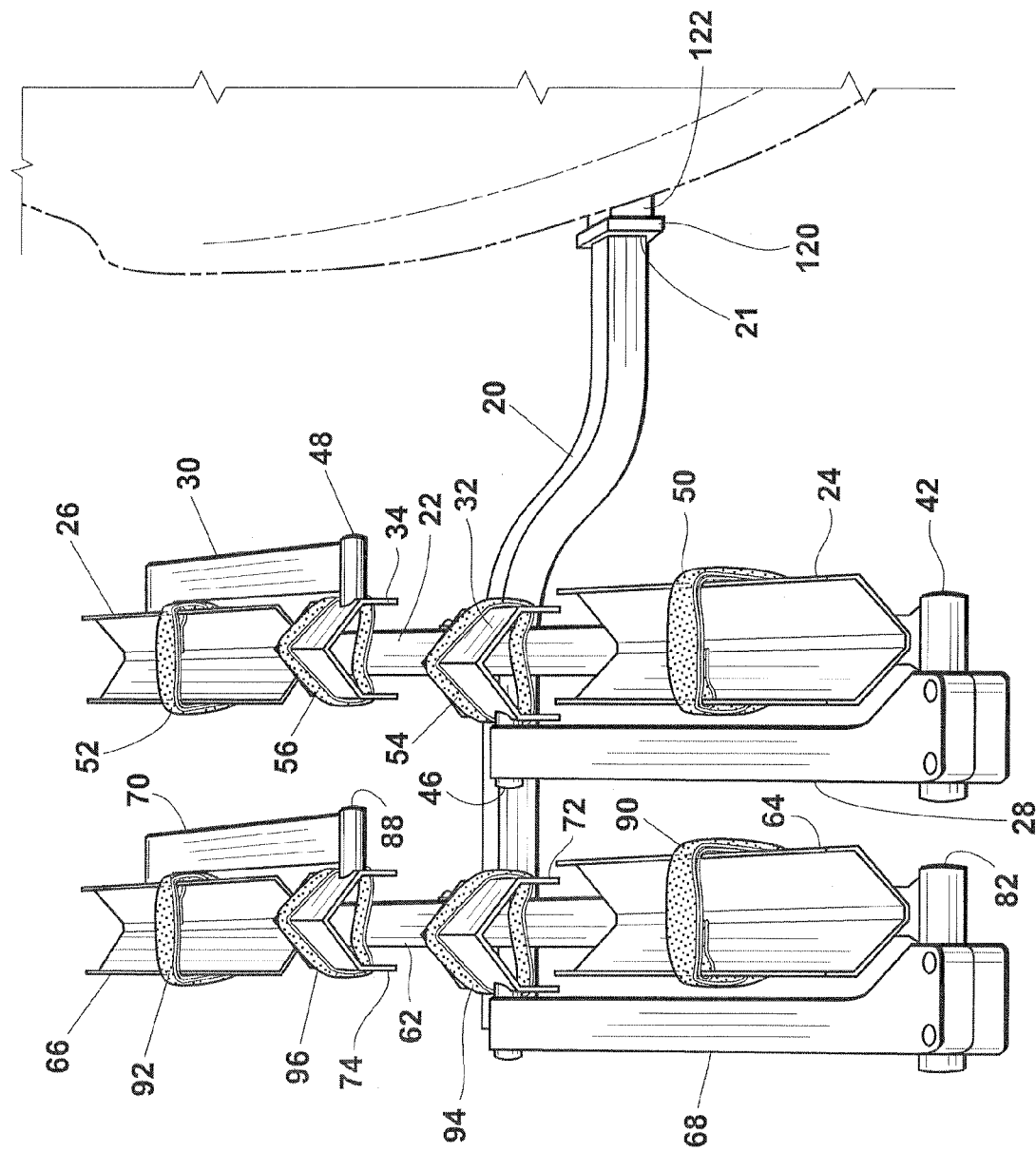
FIG. 9 depicts a side view of the bicycle carrier of the present invention secured to the trailer hitch of a vehicle.

With reference to FIGS. 8 and 9, frame rail 20 includes a drawbar configured for insertion in a receiver 120 of a vehicle trailer hitch 122. Such trailer hitch receivers are known in the art and the frame rail 20 may be sized accordingly to fit the receiver 120. Crossbar assembly 22 is secured to a frame rail 20 through the use of a saddle 36 mounted to frame rail 20. Saddle 36 receives crossbar assembly 22 and crossbar assembly 22 is secured in saddle 36 in any conventional manner such as by the use of bolts, collectively, 38 and nuts collectively, 40.

As stated, wheel trays 24 and 26 are secured to crossbar assembly 22. Wheel trays 24 and 26 are positioned on opposite ends of crossbar assembly 22 and spaced so as to receive the front and rear wheel, interchangeably, of a bicycle therein. A pair of swing arms 28 and 30 are positioned one on each end of crossbar assembly 22. Swing arms 28 and 30 pivot around pivots 42 and 44 respectively to allow swing arms 28 and 30 to pivot about crossbar assembly 22 in an arc.

Shoes 32 and 34 are secured to swing arms 28 and 30, respectively, at an end of swing arms 28 and 30 opposite where swing arms 28 and 30 are secured to crossbar assembly 22. Shoes 32 and 34, are secured to pivots 46 and 48, respectively, so that shoes 32 and 34 pivot with respect to swing arms 28 and 30, respectively.

Wheel trays 24 and 26 each include a slot 25 and 27 so as to receive, respectively, a wheel tray strap 50 and 52. Wheel tray straps 50 and 52 are designed to wrap around a wheel inserted in wheel trays 24 and 26 such as the respective front and rear wheels of a bicycle. Wheel tray straps 50 and 52 include, in the preferred embodiment, a hook and loop fastening system so as to self-adhere when wheel tray straps 50 and 52 are wrapped around a wheel of a bicycle.

In addition, shoes 32 and 34 each include a shoe strap 54 and 56. Shoe straps 54 and 56, are secured to shoes 32 and 34 respectively. Shoe straps 54 and 56, likewise, are wrapped around and engage a wheel of a bicycle so as to retain the wheel in the shoes 32 and 34.

As shown in FIG. 1, a second crossbar assembly 62 is secured to frame rail 20 adjacent crossbar assembly 22. Crossbar assembly 62 is secured to frame rail 20 using a saddle 76 identical to saddle 36 and bolts collectively, 78 secured by nuts collectively, 80. A second set of wheel trays 64 and 66 are secured to crossbar assembly 62 in the same manner as wheel trays 24 and 26. A second set of swing arms 68 and 70 are pivotally secured to crossbar assembly 62 in the same manner as the swing arms 28 and 30. Shoes 72 and 74 are pivotally secured to swing arms 68 and 70 in the same manner as shoes 32 and 34.

Wheel tray straps 90 and 92 are secured to wheel trays 64 and 66 respectively in the same manner so as to secure a bicycle wheel in wheel tray 64 or 66 in the same manner as wheel tray straps 50 and 52. Shoe straps 94 and 96 are secured to shoes 72 and 74 respectively in the same manner and in the same function as shoe straps 54 and 56.

As shown in FIG. 2, when not in use, swing arms such as 68 and 70, can be rotated (pivoted) so as to lie flat adjacent crossbar assembly 62 and shoes 72 and 74 engage crossbar assembly 62 (and secured thereto via shoe straps 94 and 96). In the alternative, when positioned to be in use, swing arms 28 and 30 may be rotated (pivoted) with respect to crossbar assembly 22 so as to be substantially vertical thereto to engage either the front or rear wheel of a bicycle (as described below).

Figure 3:
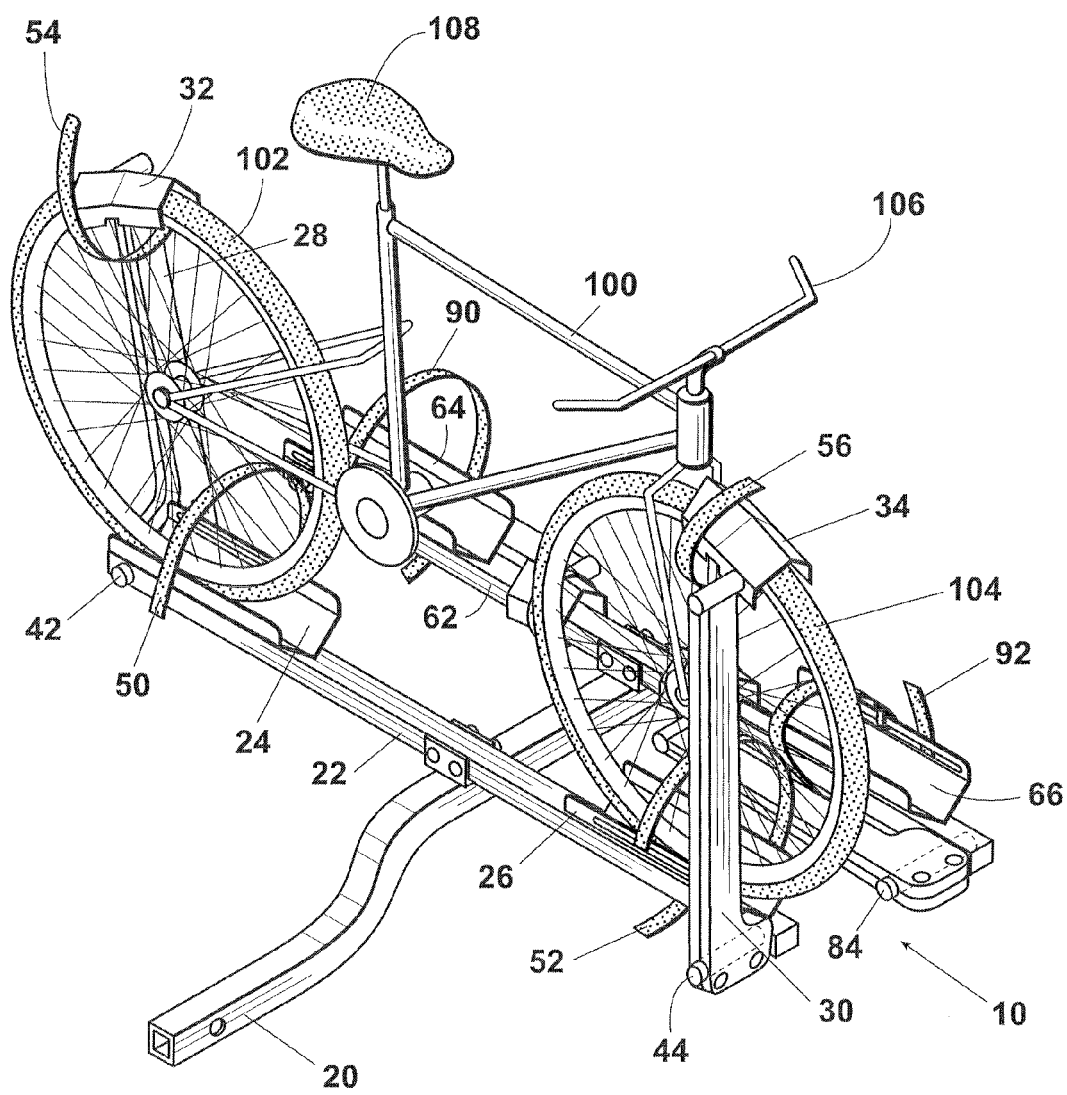
FIG. 3 depicts an isometric view of the bicycle carrier of the present invention with an exemplary bicycle thereon.
Figure 4:
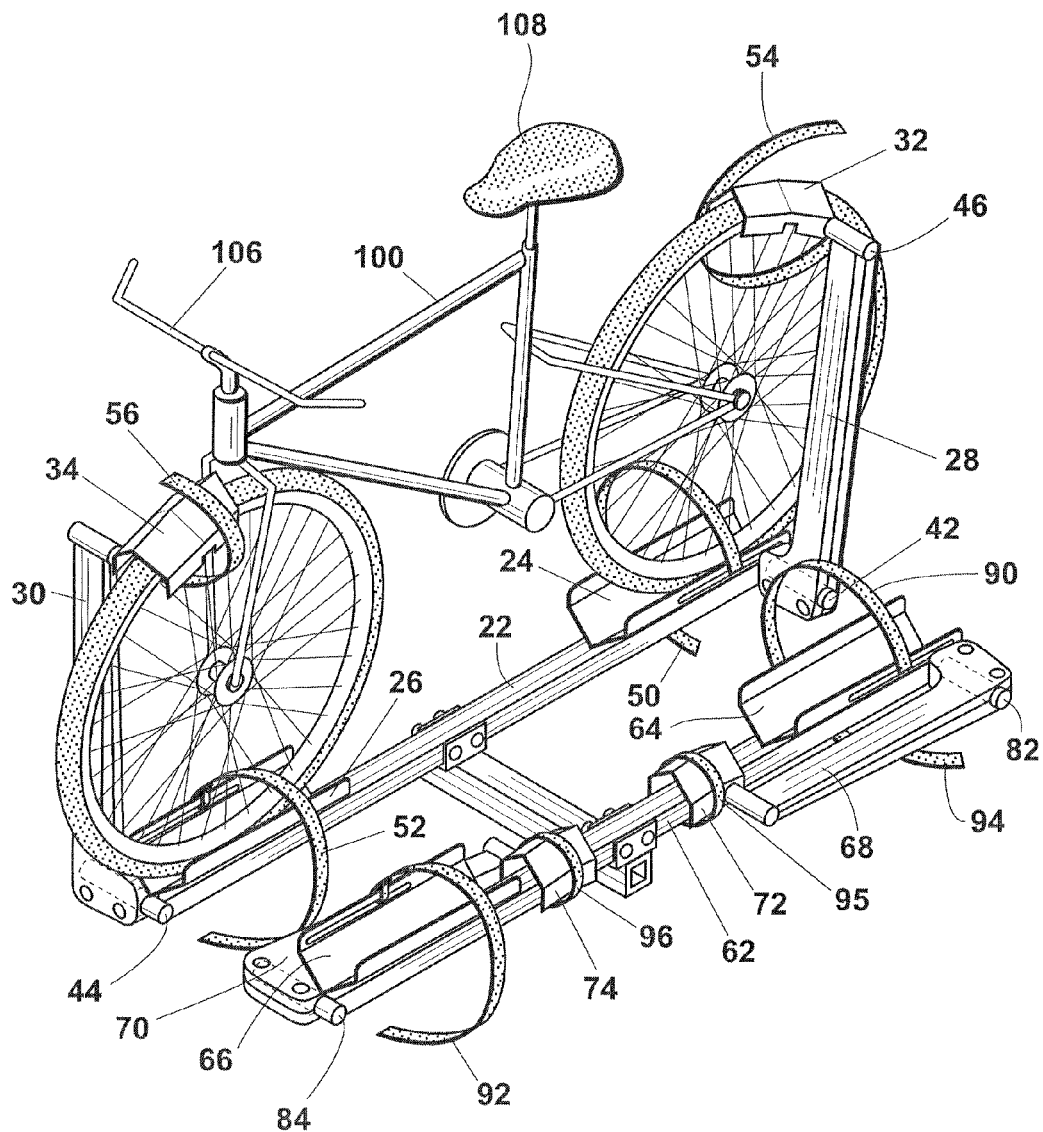
FIG. 4 is an isometric view of the bicycle carrier of the present invention with an exemplary bicycle thereon depicted from a reverse angle of FIG. 3.
Figure 5:
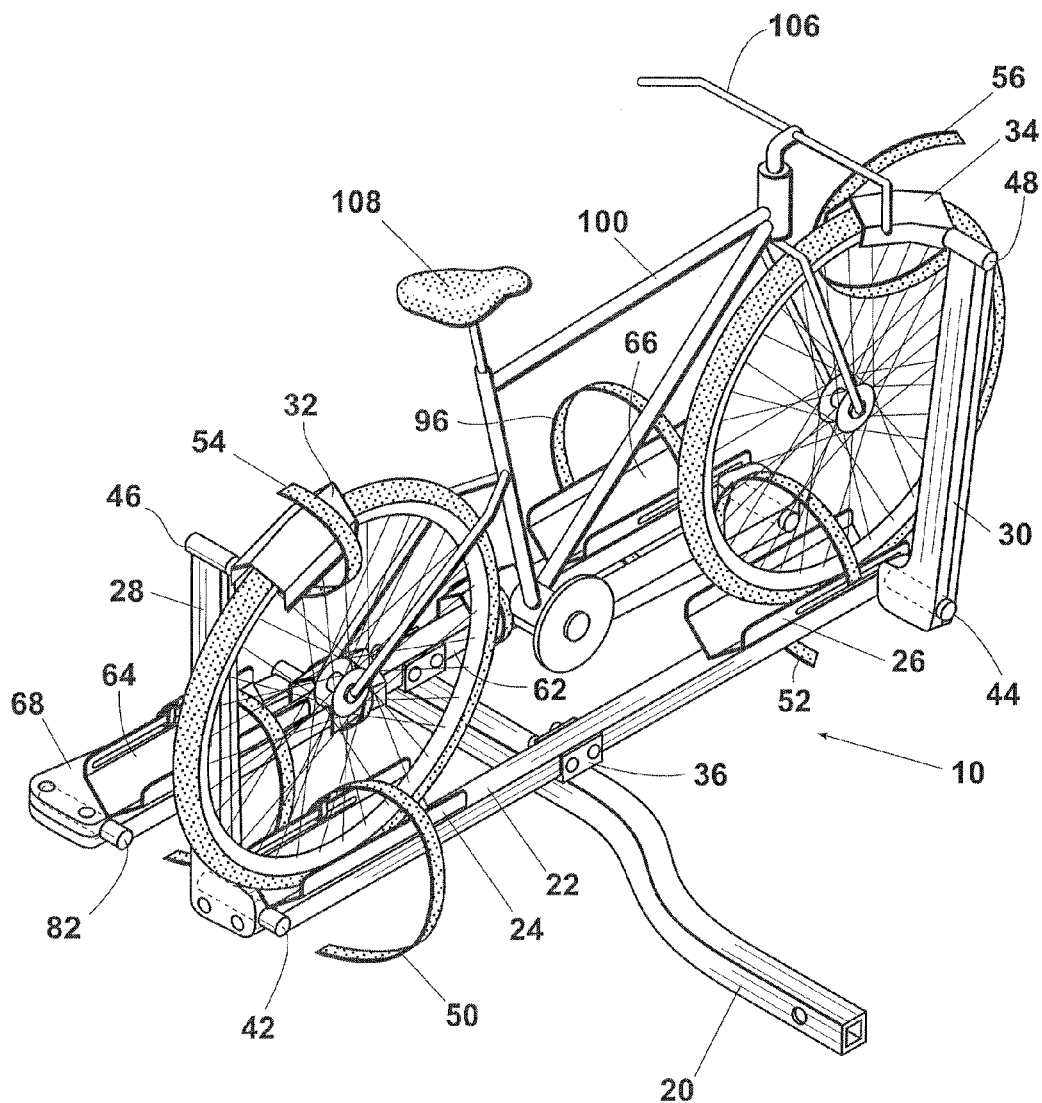
FIG. 5 depicts the bicycle carrier of the present invention with an exemplary bicycle thereon shown from an alternate angle of FIG. 3.

Referring next to FIGS. 3-5, which depict a bicycle 100 secured in carrier 10. In FIGS. 3-5, bicycle 100 is depicted in a mountain bicycle design however, it is understood that the bicycle carrier 10 of the present invention is equally useful for carrying other types of bicycles such as road bicycles, recumbent bicycles, etc.

Bicycle 100 includes rear wheel 102, and front wheel 104. Upon loading of bicycle carrier 10, swing arms 28 and 30 are pivoted with respect to crossbar assembly 22 so as to be positioned adjacent rear wheel 102 and front wheel 104, respectively. Upon loading, the wheels of the bicycle are set into wheel trays 24 and 26. It should be understood that wheel trays 24 and 26 in the preferred embodiment are identical such that it does not matter whether the front wheel 104 or the rear wheel 102 are placed into wheel trays 24 or 26. However, for the purpose of exemplification herein, in FIGS. 3-5, rear wheel 102 is placed in wheel tray 24 and front wheel 104 is placed in wheel tray 26. Once accomplished, wheel tray strap 50 is secured around rear wheel 102 so as to secure rear wheel 102 in wheel tray 24. Likewise, wheel tray strap 52 is secured around front wheel 104 so as to secure front wheel 104 in wheel tray 26. Swing arm 28 is positioned against rear wheel 102 such that shoe 32 may be pivoted and placed over rear wheel 102. Shoe strap 54 is then wrapped around shoe 32 and rear wheel 102 so as to secure shoe 32 (and swing arm 28) to rear wheel 102. Likewise, swing arm 30 is pivoted and positioned such that shoe 34 may be pivoted and positioned onto front wheel 104. Shoe strap 56 is then wrapped around shoe 34 and wheel 104 so as to secure front wheel 104 to shoe 34 (and swing arm 30). In this manner, bicycle 100 is securely restrained onto bicycle carrier 10. A second bicycle may be placed in bicycle carrier 10 in trays 64 and 66.

Figure 6:
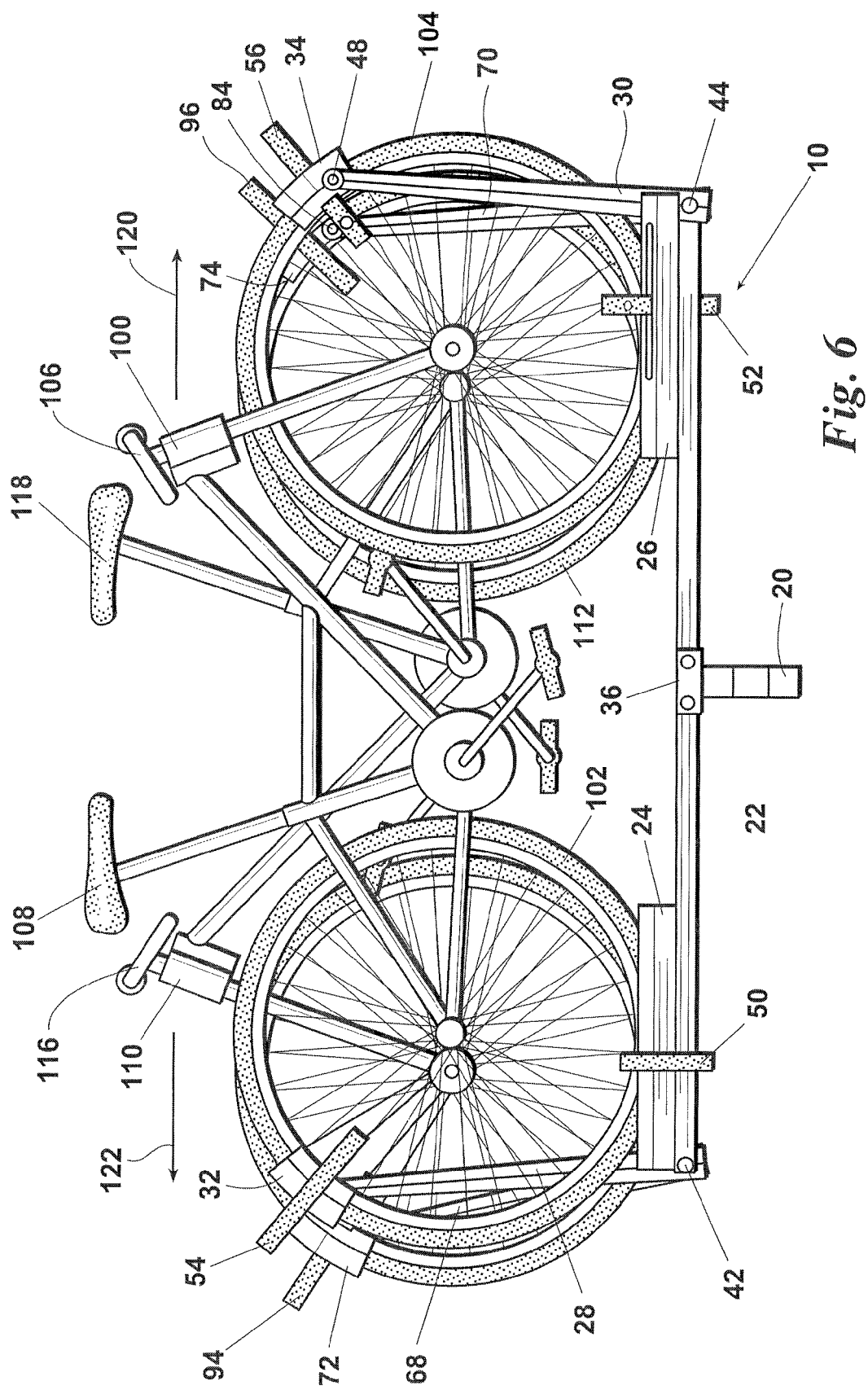
FIG. 6 is a side view of the bicycle carrier of the present invention depicted with two (2) bicycles thereon in a nested configuration.

Referring next to FIG. 6, a second bicycle 110 is inserted into bicycle carrier 10 adjacent bicycle 100 and secured in bicycle carrier 10 in a like manner as bicycle 100. In a preferred arrangement, bicycle 110 would be positioned in bicycle carrier 10 in the reverse of bicycle 100 such that the front wheel 114 of bicycle 110 is positioned adjacent the rear wheel 102 of bicycle 100. In like manner, the rear wheel 112 of bicycle 110 is positioned adjacent the front wheel 104 of bicycle 100. When bicycles 100 and 110 are loaded onto bicycle carrier 10, each respective bicycle is moved a few inches forward (in reverse directions of one another) such that bicycle 100 is moved in direction 120 while bicycle 110 is moved in direction 122 as depicted in FIG. 6. In this way, the respective crank arms, pedals, handlebars 106 and 116 and seats 108 and 118 are not positioned touching each other and cannot rub against one another during transport. As such, it is a feature of the bicycle carrier 10 of the present invention to thus allow multiple bicycles such as bicycles 100 and 110 to nest adjacent one another and be positioned in close proximity to one another without causing damage to bicycles 100 and 110 as a result of contact between bicycles 100 and 110.

Figure 7:
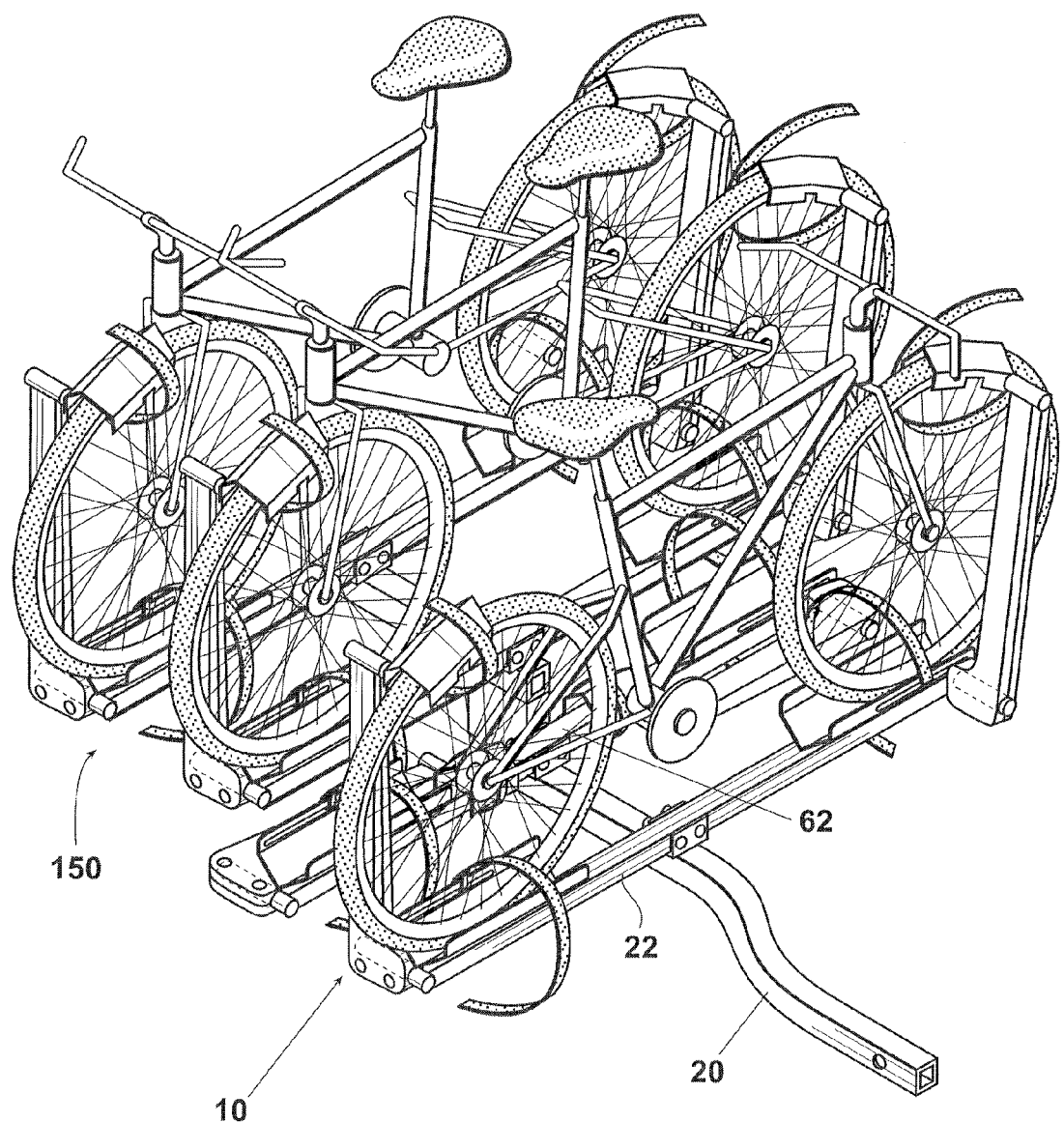
FIG. 7 depicts the bicycle carrier of the present invention including an exemplary bicycle thereon and an alternate embodiment extension including multiple bicycles depicted thereon.

Referring next to FIG. 7, it is contemplated as a part of the present invention in an alternate embodiment that an additional section, such as section 150 may be added to bicycle carrier 10 such that additional bicycles could be transported. It is also contemplated that a single bicycle embodiment could be employed where it is desired to minimize the length of bicycle carrier 10. Moreover, it is contemplated that frame rail 20 could be hinged such that crossbar assemblies 22 and 62 could be pivoted up and adjacent the vehicle when not carrying bicycles thereon. In this embodiment, during periods of non-use, the length of bicycle carrier 10 is thus greatly reduced.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A carrier for a bicycle having wheels including a center hub where the carrier for attachment to a vehicle with a trailer hitch including a receiver, the carrier comprising:
    a frame including a drawbar for insertion into the receiver;
    at least one tray secured to said frame for receiving at least one wheel of the bicycle;
    at least one swing arm having a non-adjustable length pivotably secured to said frame;
    at least one shoe pivotably secured to said at least one swing arm at a fixed point along its length;
    said at least one swing arm is capable of pivoting from a position parallel to at least one of said at least one tray to a position for said at least one shoe to contact at least one bicycle wheel received in said at least one of said at least one tray above the center hub; and
    at least one coupling for securing said at least one shoe to at least one bicycle wheel.

2. The bicycle carrier of claim 1 wherein said swing arm has a fixed length.

3. The bicycle carrier of claim 1 wherein said shoe has a length capable of contacting a segment of said at least one bicycle wheel.

4. The bicycle carrier of claim 1 wherein said at last one coupling is a shoe strap.

5. The bicycle carrier of claim 4 wherein said at least one shoe strap includes a hook and loop fastening system.

6. The bicycle carrier of claim 1 further including at least one coupling for securing the bicycle wheels to said at least one tray.

7. The bicycle carrier of claim 6 wherein said at least one coupling is a tray strap.

8. The bicycle carrier of claim 7 wherein said at least one tray strap includes a hook and loop fastening system.

9. The bicycle carrier of claim 1 wherein said frame comprising:
    a frame rail including said drawbar;
    a crossbar assembly secured to said frame rail to which said at least one tray is attached.

10. The bicycle carrier of claim 9 wherein said frame rail and said crossbar assembly each include:
    a longitudinal axis such that when said crossbar assembly is secured to said frame rail, the longitudinal axis of said crossbar assembly is perpendicular to the longitudinal axis of said frame rail.

11. The bicycle carrier of claim 10 wherein said crossbar assembly is removably secured to said frame rail.

12. The bicycle carrier of claim 10 including multiple crossbar assemblies in order to accommodate multiple bicycles.

13. The bicycle carrier of claim 10 wherein said crossbar has a first end and a second end and said at least one swing arm is pivotably secured adjacent said first end.

14. The bicycle carrier of claim 13 wherein a second swing arm is pivotably secured adjacent said second end.

15. A carrier for a bicycle having two wheels where the carrier is capable of attachment to a vehicle, the carrier comprising;
    a drawbar for connection to the vehicle;
    a frame connected to said drawbar;
    two trays supported by said frame wherein each tray receives a wheel of the bicycle;
    at least one swing arm having a first end, a second end, and a non-adjustable length;
    said at least one swing arm pivotably secured to said frame;
    a shoe configured so as to be capable of being placed over a bicycle wheel;
    said shoe pivotably secured to said at least one swing arm for being placed over at least one bicycle wheel.

16. The bicycle carrier of claim 15 further including at least one coupling for securing the bicycle wheel to said shoe.

17. A carrier for a bicycle having two wheels each including a center hub where the carrier is capable of attachment to a vehicle trailer hitch, the carrier comprising:
    a drawbar capable of connection to the trailer hitch;
    a frame connected to said drawbar,
    a crossbar having a first end and a second end supported by said frame;
    said frame and said crossbar each including a longitudinal axis wherein the longitudinal axis of said frame is perpendicular to the longitudinal axis of said crossbar;
    a first tray supported by said crossbar adjacent said first end capable of receiving one wheel of the bicycle;

a second tray supported by said crossbar adjacent said second end capable of receiving the other wheel of the bicycle;

a first swing arm having a length pivotably secured to said crossbar adjacent said first end;

a second swing arm having a length pivotably secured to said crossbar adjacent said second end;

said first swing arm and said second swing arm each including a coupling positioned at a fixed point along its length so as to be capable of being secured to a respective wheel of the bicycle above the center hub;

said coupling on said first swing arm capable of applying a first force on a respective wheel of the bicycle and said coupling on said second swing arm capable of applying a second force on a respective wheel of the bicycle such that said first force substantially opposes said second force so as to secure the bicycle in the carrier.

18. The carrier of claim 17 wherein said first swing arm and said second swing arm each have a fixed length.

19. The carrier of claim 18 wherein said first swing arm and said second swing arm each include a shoe pivotably connected thereto and said couplings are capable of securing said shoes to the bicycle wheels.

20. The carrier of claim 19 wherein each said shoe has a length capable of contacting a segment of the bicycle wheels.

* * * * *